April 7, 1936.                E. G. KESLING                2,036,528
                               FLEXIBLE SHAFT
                             Filed Sept. 26, 1934
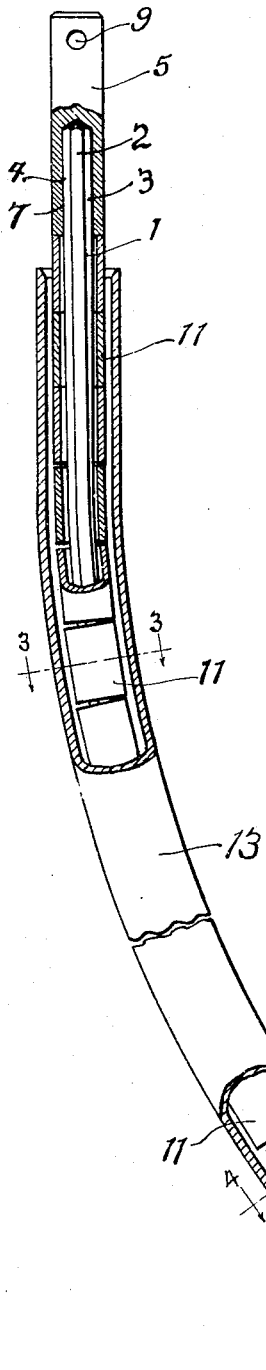
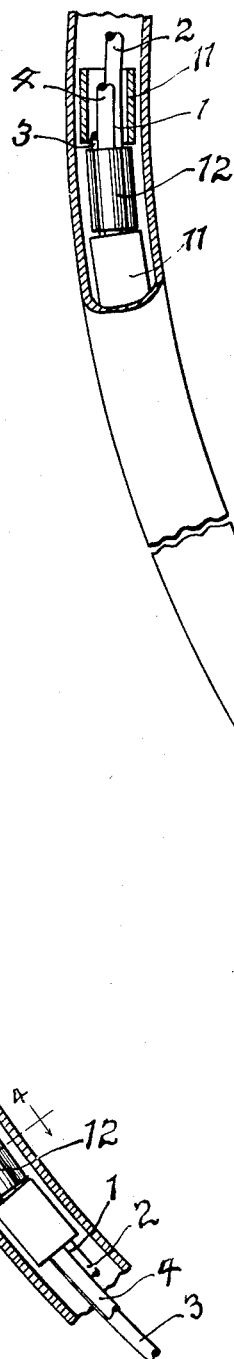
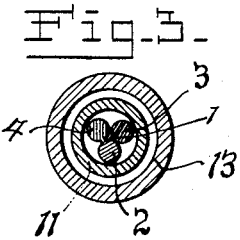
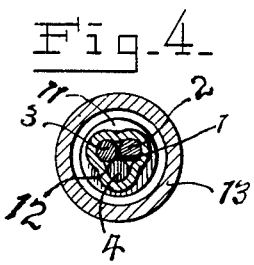
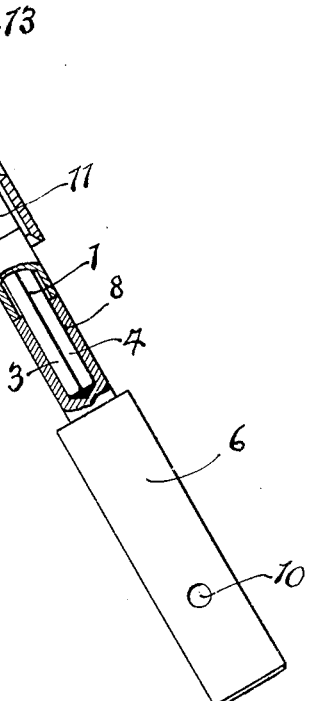
Inventor
Elmer G. Kesling.

Patented Apr. 7, 1936

2,036,528

UNITED STATES PATENT OFFICE 2,036,528

FLEXIBLE SHAFT

Elmer G. Kesling, Bloomfield, Mo.

Application September 26, 1934, Serial No. 745,507

15 Claims. (Cl. 64—2)

This invention relates to flexible shafts, and especially that type in which the forces of action are transmitted by the so-called core of the shaft.

Objects of the invention are to provide an improved flexible shaft of simple design and of easy construction; to provide a shaft wherein all forces of action are transmitted through and by means comprising a plurality of wires; to provide a shaft in which a plurality of wires are twisted upon themselves an integral number of half-turns; to provide a shaft in which a plurality of wires are twisted about a common axis an integral number of half-turns and positively attached together only at their ends and at the junction of the half-turns; to provide a shaft in which a plurality of wires are twisted about a common axis an integral number of half-turns and held in proper contiguous relation by a series of tubes loosely mounted thereon and a clamp tightly mounted thereon between said series of tubes at the junction of the half-turns and having end elements to which the ends of said wires are positively secured; and to provide a flexible shaft that may be mounted in a curved supporting and guiding tube and may be operated to substantially transmit motion from one end to the other end of the shaft.

Another object of the invention is to provide an improved flexible shaft embodying all of the essential features and elements of utility herein disclosed, or otherwise made apparent from the following description, reference being made to the annexed drawing, in which—

Fig. 1 is a view illustrating one end portion of my improved flexible shaft mounted in a supporting and guiding tube and showing an end element beyond the tube for operative connection.

Fig. 2 is a similar view illustrating the opposite end of the flexible shaft and showing an end element beyond the tube for operated connection.

Fig. 3 is an enlarged sectional view on line 3—3 of Fig. 1.

Fig. 4 is an enlarged sectional view on line 4—4 of Fig. 1.

The flexible element 1 of the shaft, as shown, comprises three substantially parallel solid wires 2, 3 and 4 which have one of their ends positively attached to the operative end element 5 and the other of their ends positively attached to the operated end element 6.

In the specific arrangement shown, one end of the flexible element 1 extends into an axial hole 7 in the end element 5, and the other end of the flexible element 1 extends into an axial hole 8 in the end element 6 and is made rigid with said elements 5 and 6 in some appropriate way, as by soldering or welding. It being understood, however, that said wires 2, 3 and 4 may be soldered or welded together at the ends, and subsequently secured to said end elements 5 and 6 or directly secured to any operating and operated members, not shown.

The element 5 may be provided with a formation 9 for engagement with an operating member, not shown; and the element 6 may be provided with a formation 10 for engagement with an operated member, not shown.

The flexible element 1 is secured to the end elements 5 and 6 while all parts are in a straightened position so all of the wires of the element 1 will have the same lineal length. It has been found, however, that the wires 2, 3 and 4 in their relaxed condition must be twisted upon themselves an integral number of half-turns between the end elements 5 and 6 in order to prevent unequal longitudinal stress in said wires during the required flexed condition of the shaft. The integral number of half-turns given the wires prevents unequal longitudinal stress in the wires during flexure of the shaft because a given wire will be positioned on one side of the shaft at one end of a given half-turn and the same given wire will be positioned on the opposite side of the shaft at the other end of the given half-turn.

It is obvious then that flexure of the shaft tends to lengthen that part of the wire positioned on the outer side of the bend and to shorten that part of the wire positioned on the inner side of the bend; however it has been found that, if the wires of such a flexible shaft have been twisted upon themselves a half-turn, these lengthening and shortening forces will be exactly equal and, therefore, the several wires of the shaft will relatively move longitudinally between the ends of the half-turn but will not relatively move longitudinally at the ends of the half-turn. This being true of a shaft having a single half-turn of the wires, it is also true of a shaft having an integral number of half turns. It is clearly seen, then, that the wires of a shaft comprising a plurality of wires twisted upon themselves or about a common axis an integral number of half-turns will always be in equal longitudinal stress regardless of the flexure of the shaft.

It is to be understood that throughout this specification and the appended claims, the expression "half-turn" describing the amount of twist given the wires shall not mean absolutely perfect half-turns, since a slight amount of twist over or under such half-turns will be tolerated in the operation of the shaft.

The flexible element 1, between the end elements 5 and 6, passes through a number of alignment tubes 11 which may be interspersed with clasping tubes 12.

The tubes 11 and 12 are to be of such length and so spaced and the hole of the tubes 11 is of such diameter to freely allow the required flexure of the shaft.

Objects of the tubes 11 are to hold the wires 2, 3 and 4 in substantially contiguous relation and to give substantially continuous bearing to the shaft in the supporting and guiding tube 13 so said wires cannot buckle under longitudinal and turning forces.

The wires 2, 3 and 4 are tightly grasped by the clasping tubes 12, or otherwise secured together, at about the junction of the half-turns of said wires. This positive securing aids in preventing twisting of the element 1, when turning forces are applied to the shaft. Such positive securing at other points along the wires would interfere with the flexure of the shaft; since flexure causes the wires 2, 3 and 4 to have individual longitudinal movements except at the ends and at the junction of said half-turns. This individual longitudinal movement must be free to insure easy flexure of the shaft, and the said twisting must not exceed the point of elasticity of said wires, therefore the number of half-turns in a given shaft is limited. Too much twist will cause the shaft to be too stiff. In certain constructions of the shaft, a smaller guiding tube 13 may be used and the wires 2, 3 and 4 secured directly together at the junction of the half-turns by soldering or welding, and the tubes 11 and 12 not used at all.

In the assembly shown, the flexible element 1 comprises three wires. Of course, any number of wires may be used, but three wires is the preferred number. It has been found that three wires, arranged as shown, has less flexive resistance than a single wire of a size to transmit equal turning forces.

As shown, the shaft is supported in and guided by the curved tube 13, the end element 5 extending beyond one end of said tube and the end element 6 extending beyond the opposite end of said tube. When the tubes 11 and 12 are not used, sufficient space is left between the ends of the tube 13 and the end elements 5 and 6 to permit the required longitudinal movements of the shaft. This permits free longitudinal and turning movements of the flexible shaft within the curved supporting and guiding tube.

This shaft may be applied to various useful purposes, particularly where either turning or longitudinal movements, or both, of the flexible shaft is required in a curved position of the shaft. In such mounting, this shaft is operative to substantially transmit longitudinal and turning movements to the operated member.

In the embodiment of the invention shown, the end element 5 may be manually or otherwise operated, and the element 6 may be utilized to attach the shaft to the part to be operated, or this adaptation may be reversed.

The construction and arrangement of the shaft elements and their mounting may be varied within the scope of equivalent limits without departure from the nature and principle of the invention. I contemplate such variations as may be needed or required to adapt the invention to its various uses. Accordingly, without restricting myself in unessential particulars, I claim:

1. A shaft of the character described comprising a plurality of wires for transmitting turning and longitudinal movements, said wires being twisted upon themselves a number of half-turns to maintain equal longitudinal stress in said wires during said movements, and means positively securing said wires together only at each end and at the junction of said half-turns to increase torsional resistance in said shaft.

2. A shaft of the character described comprising end elements, three solid wires twisted about themselves a number of half-turns and positively attached to and extending between said end elements, series of tubes mounted loosely and in spaced end to end relation on said wires, and a tightly clasped tube mounted on said wires between said series of tubes at the junction of each half-turn of said wires.

3. An article of manufacture consisting of a plurality of wires twisted upon themselves a number of full half-turns, and positively attached together only at their ends and at the junction of the half-turns.

4. An article of manufacture consisting of a plurality of wires twisted upon themselves a half-turn only, and positively attached together only at their ends.

5. A shaft of the character described comprising end elements, a plurality of wires twisted upon themselves a half-turn only, means attaching said wires together only at their ends, and means attaching said attached ends of said wires to said end elements respectively.

6. A shaft of the character described comprising end elements, a plurality of wires twisted upon themselves a half-turn only, means attaching said wires together only at their ends, said means also attaching the ends of said wires to said end elements respectively, and means mounted on said wires for holding said wires in close contiguous relation.

7. A shaft of the character described comprising end elements, and a plurality of wires twisted upon themselves an integral number of half-turns and positively attached to and extending between said end elements.

8. A shaft of the character described comprising end elements, a plurality of wires twisted upon themselves an integral number of half-turns and positively attached to and extending between said end elements, and means in connection with said wires to hold said wires in close contiguous relation.

9. An article of manufacture consisting of a plurality of wires twisted upon themselves an integral number of half-turns, and fastened together only at their ends.

10. An article of manufacture consisting of a plurality of wires twisted upon themselves an integral number of half-turns, and fastened together only at their ends and at the junction of some of said half-turns.

11. A shaft of the character described, a portion of which is flexible, said flexible portion consisting of a plurality of wires twisted upon themselves an integral number of half-turns.

12. A shaft of the character described comprising a plurality of wires twisted about a common axis an integral number of half-turns, and fastened together only at their ends.

13. A shaft of the character described comprising a plurality of wires twisted about a common axis an integral number of half-turns, and fastened together only at their ends and at the junction of said half-turns.

14. A shaft of the character described comprising a plurality of wires twisted about a common axis an integral number of half-turns, and fastened together only at their ends and at the junction of some of said half-turns.

15. A shaft of the character described, a portion of which is flexible, said flexible portion consisting of a plurality of wires twisted about a common axis an integral number of half-turns.

ELMER G. KESLING.